(12) United States Patent
Caussat

(10) Patent No.: US 7,109,676 B2
(45) Date of Patent: Sep. 19, 2006

(54) CONTROL FOR ELECTRIC MOTOR IN VEHICLES

(75) Inventor: Thierry Roger Caussat, West Bloomfield, MI (US)

(73) Assignee: Valeo Electrical Systems, Inc., Auburn Hills, MI (US)

(*) Notice: Subject to any disclaimer, the term of this patent is extended or adjusted under 35 U.S.C. 154(b) by 0 days.

(21) Appl. No.: 11/129,110

(22) Filed: May 13, 2005

(65) Prior Publication Data

US 2005/0206336 A1 Sep. 22, 2005

Related U.S. Application Data

(63) Continuation-in-part of application No. 10/720,813, filed on Nov. 24, 2003, now Pat. No. 6,933,694.

(51) Int. Cl.
  *H02P 1/04* (2006.01)
  *H02P 3/00* (2006.01)

(52) U.S. Cl. ............ 318/461; 318/286; 318/443; 318/445; 318/446; 180/280; 701/49

(58) Field of Classification Search ........ 318/280–284, 318/443–446, 466, 463, 663, 469, 461, 286; 180/280; 701/49
See application file for complete search history.

(56) References Cited

U.S. PATENT DOCUMENTS

| | | | |
|---|---|---|---|
| 5,334,876 A | 8/1994 | Washeleski et al. | |
| 5,422,551 A | 6/1995 | Takeda et al. | |
| 5,459,379 A | 10/1995 | Takeda et al. | |
| 5,483,133 A | 1/1996 | Takabe et al. | |
| 5,530,329 A | 6/1996 | Shigematsu et al. | |
| 5,539,290 A * | 7/1996 | Lu et al. ................ | 318/565 |
| 5,585,702 A | 12/1996 | Jackson et al. | |
| 5,616,997 A | 4/1997 | Jackson et al. | |
| 5,650,698 A | 7/1997 | Ito et al. | |
| 5,723,960 A * | 3/1998 | Harada ................ | 318/469 |
| 5,856,733 A * | 1/1999 | Matsumoto et al. ..... | 318/663 |
| 5,983,567 A | 11/1999 | Mitsuda | |
| 5,994,858 A | 11/1999 | Miura | |
| 6,034,495 A | 3/2000 | Tamagawa et al. | |
| 6,034,497 A | 3/2000 | Tamagawa et al. | |
| 6,043,620 A | 3/2000 | Koestler | |
| 6,054,822 A | 4/2000 | Harada | |
| 6,064,165 A | 5/2000 | Boisvert et al. | |
| 6,274,947 B1 | 8/2001 | Terashima | |
| 6,297,609 B1 * | 10/2001 | Takahashi et al. ....... | 318/484 |
| 6,298,295 B1 | 10/2001 | Tyckowski | |
| 6,426,604 B1 | 7/2002 | Ito et al. | |
| 6,534,939 B1 | 3/2003 | Kato et al. | |
| 6,555,982 B1 | 4/2003 | Tyckowski | |
| 6,563,279 B1 | 5/2003 | Sugawara | |
| 6,573,676 B1 * | 6/2003 | Klesing ................ | 318/445 |
| 6,580,241 B1 | 6/2003 | Sugawara | |
| 6,580,242 B1 | 6/2003 | Hirose et al. | |
| 6,597,139 B1 * | 7/2003 | Klesing ................ | 318/445 |
| 6,605,911 B1 * | 8/2003 | Klesing ................ | 318/286 |

(Continued)

*Primary Examiner*—Paul Ip
(74) *Attorney, Agent, or Firm*—Jacox Meckstroth & Jenkins

(57) ABSTRACT

A control for an electric motor in a vehicle. The control ascertains whether an obstacle is interfering with rotation of the motor. The control establishes a baseline speed, representing normal free running speed of the motor. This baseline speed will be different, in different operating environments. Then the control determines whether measured motor speed drops below the baseline speed by a predetermined amount. If so, then the motor is shut down, or reversed.

8 Claims, 15 Drawing Sheets

U.S. PATENT DOCUMENTS

| | | |
|---|---|---|
| 6,633,148 B1 * | 10/2003 | Klesing .................... 318/445 |
| 6,667,590 B1 | 12/2003 | Nagaoka |
| 6,690,129 B1 | 2/2004 | Sutter et al. |
| 6,713,977 B1 | 3/2004 | Sutter et al. |
| 6,788,016 B1 | 9/2004 | Whinnery |
| 2002/0180390 A1 * | 12/2002 | Tyckowski ................ 318/445 |
| 2002/0190680 A1 * | 12/2002 | Gerbetz .................... 318/445 |
| 2003/0189415 A1 | 10/2003 | Fitzgibbon |
| 2004/0065498 A1 | 4/2004 | Onozawa et al. |
| 2004/0257010 A1 * | 12/2004 | Yamamoto .................. 318/55 |

* cited by examiner

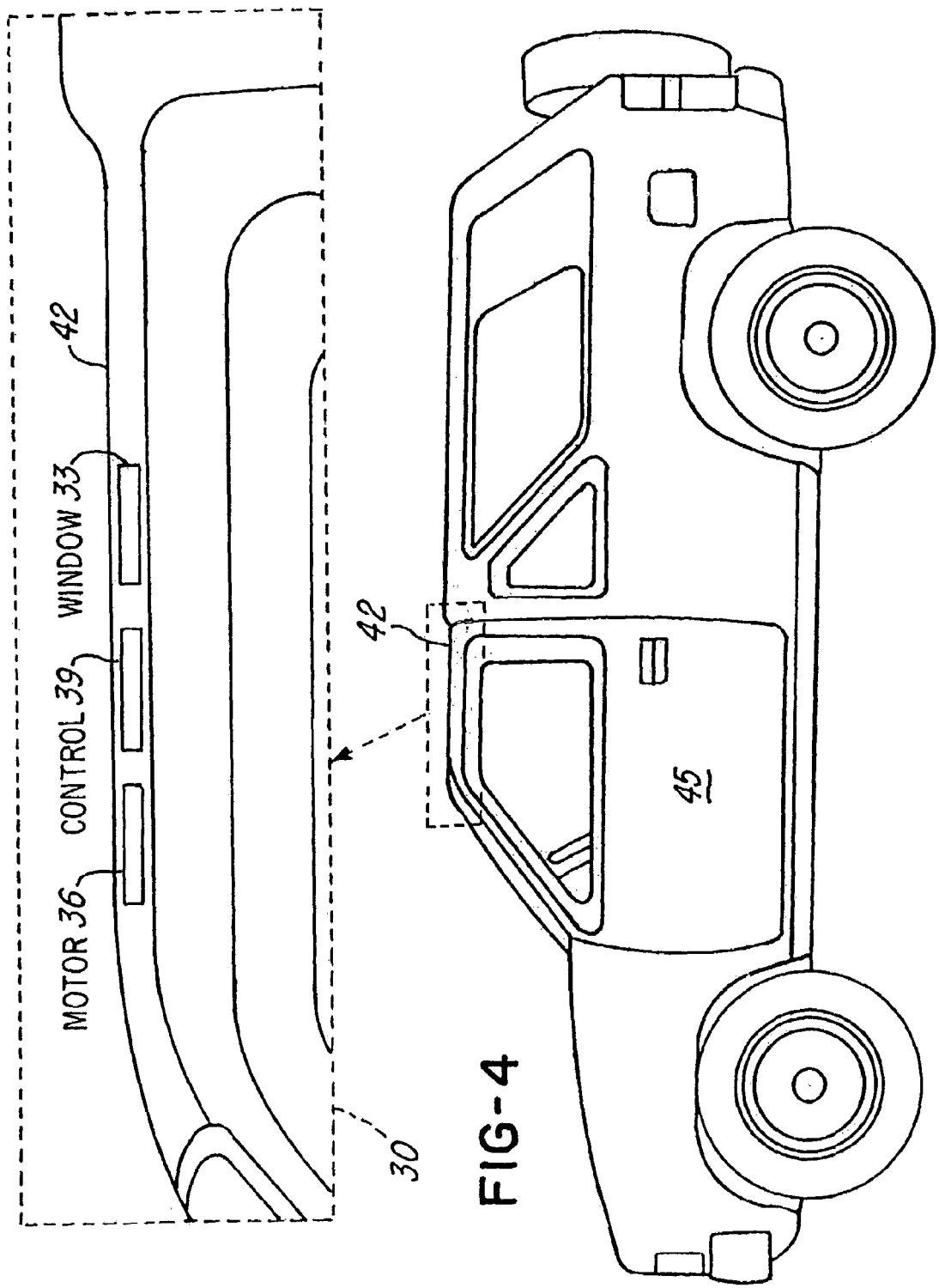

$$Tf_{(k)} = \frac{\sum_{i=k}^{k-n} T_i}{n} \qquad \text{EQUATION (1)}$$

$$\Delta T_{(k)} = (Tf_{(k)} - Tf_{(k-1)}) \qquad \text{EQUATION (2)}$$

$$RS_{(k)} = \sum_{x=0}^{x=k} \Delta T_{(x)} \qquad \text{EQUATION (3)}$$

$$Trs(x) = \int \left(\left[\frac{d(Tf(x))}{dx}\right]\right)dx + IC \qquad \text{EQUATION (4)}$$

$$Trs(x) = \left[\int (\frac{d(Tf(x))}{dx})dx + IC(=0)\right]^{Saturated\,to\,ZERO} \qquad \text{EQUATION (5)}$$

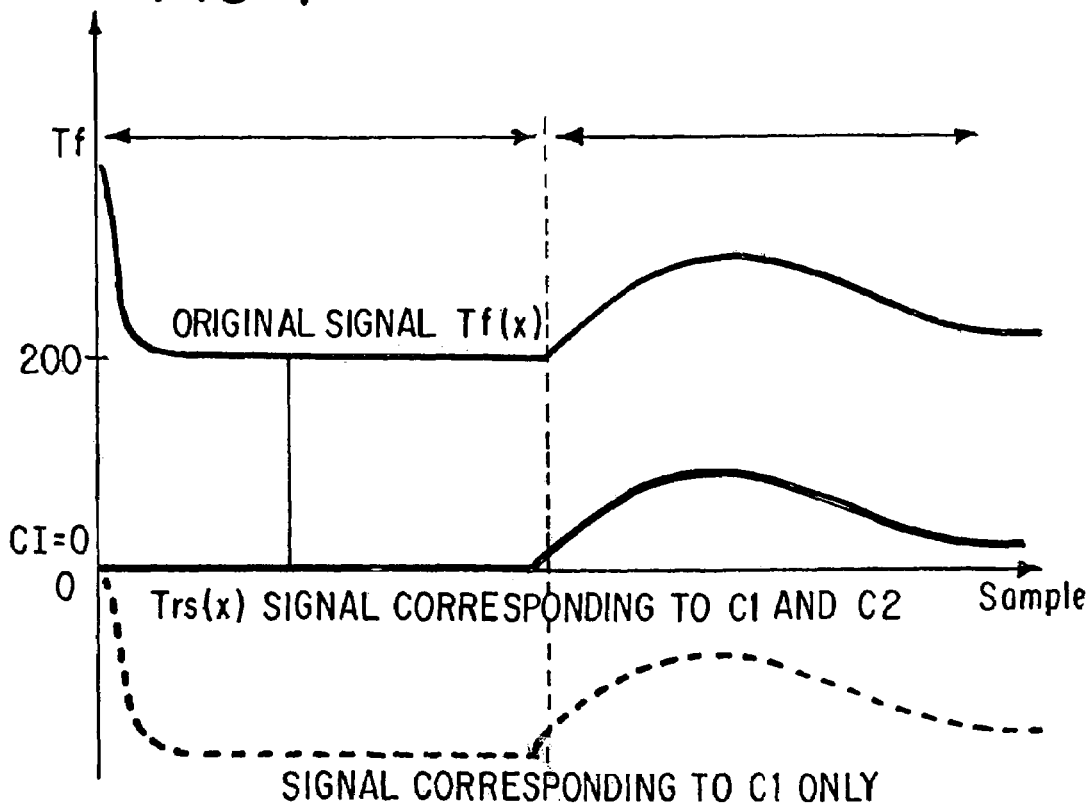
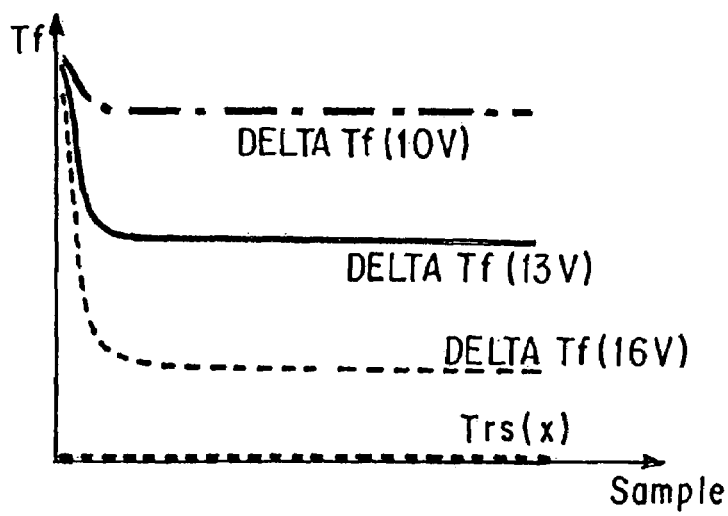

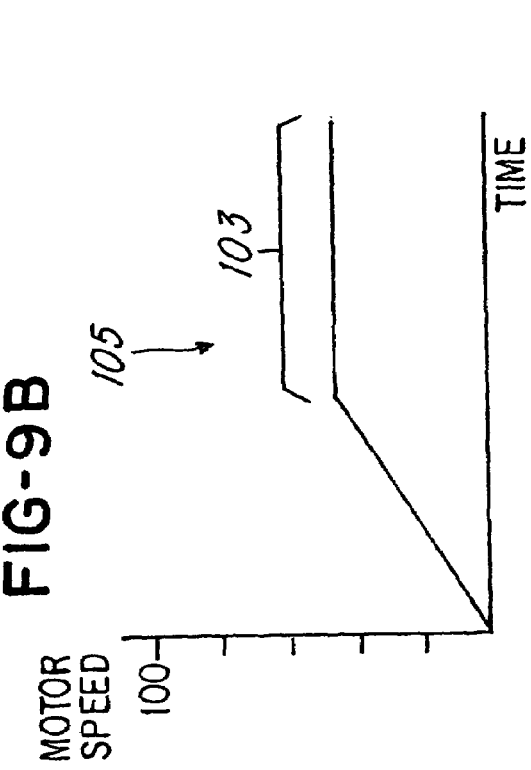
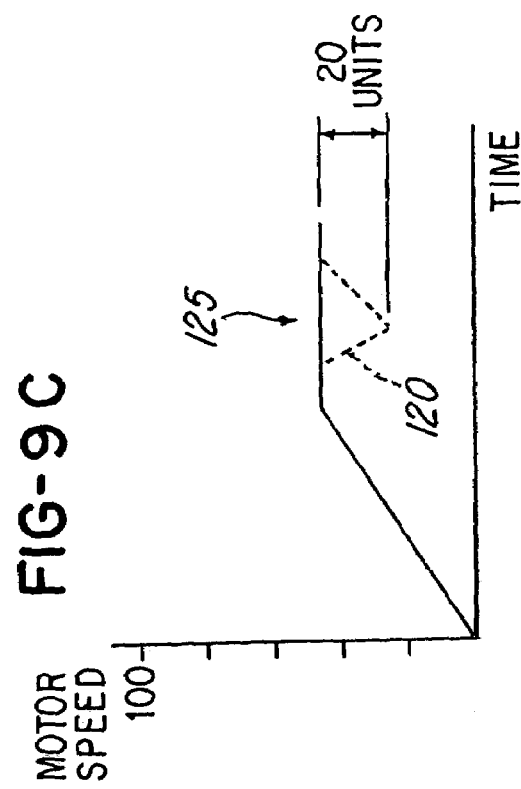
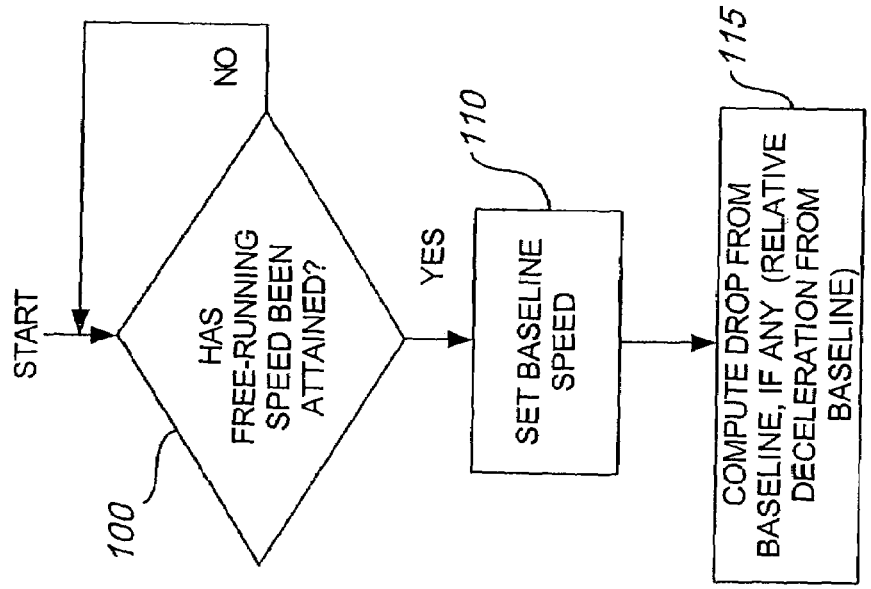

FIG - 10A
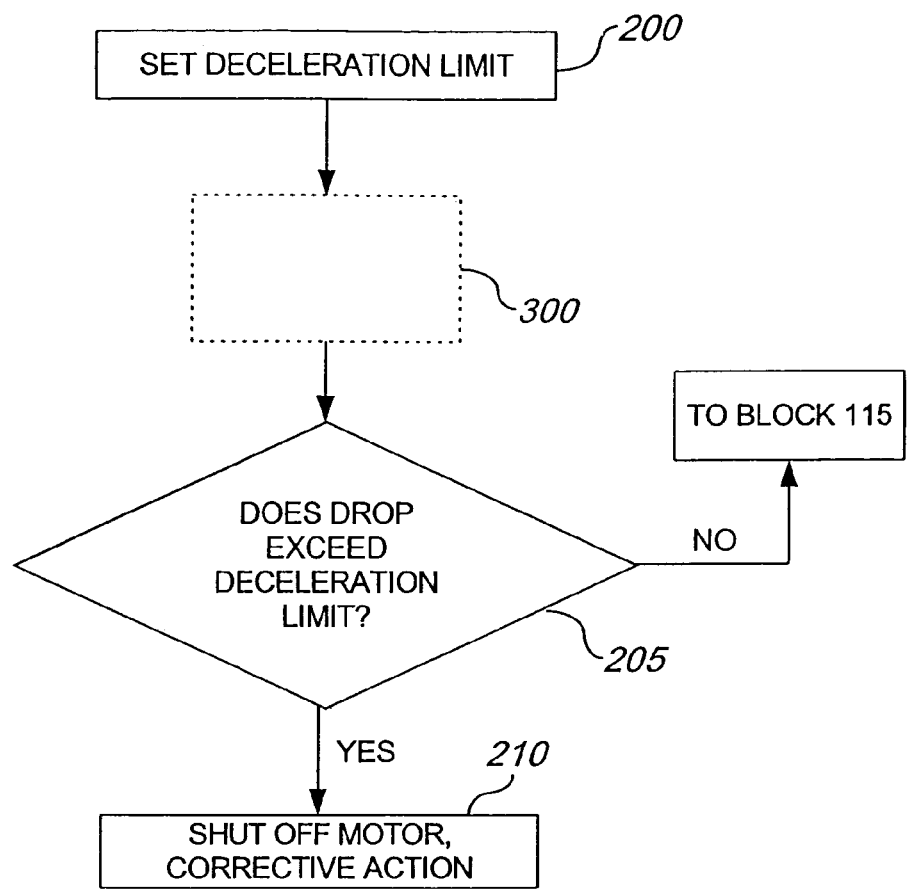
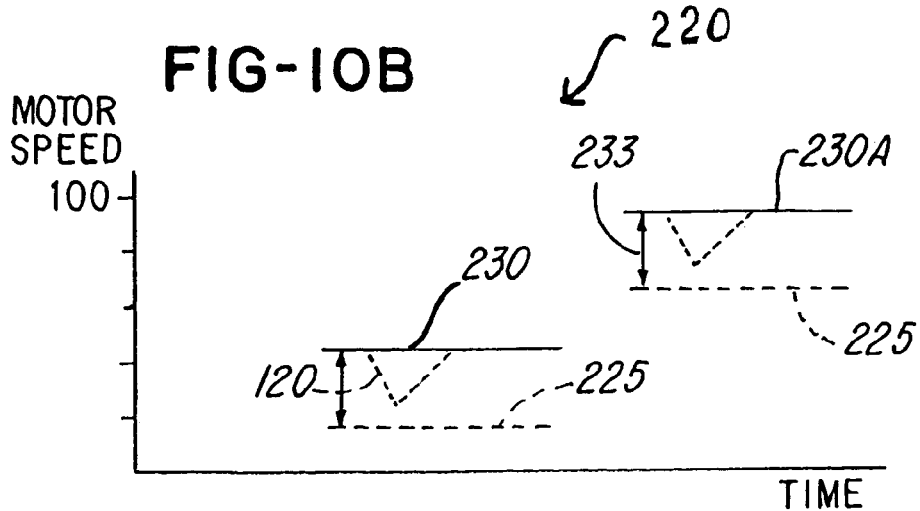

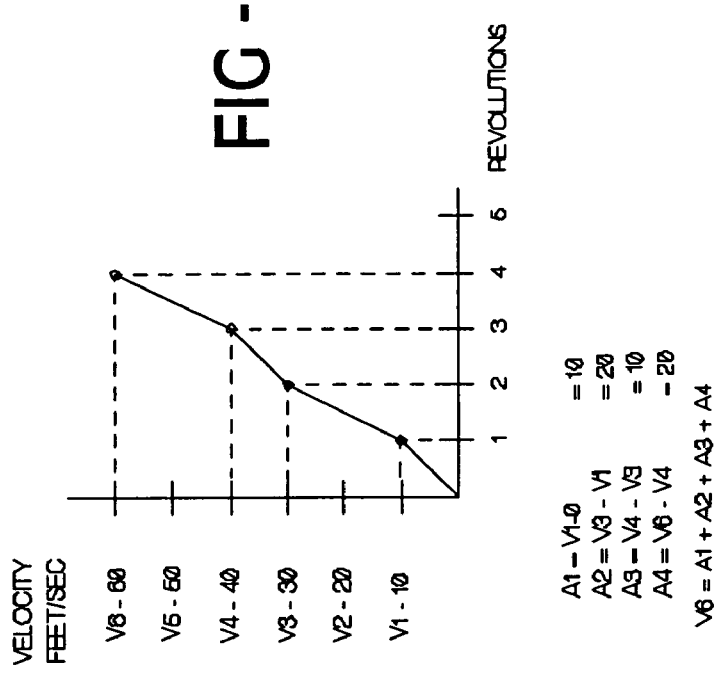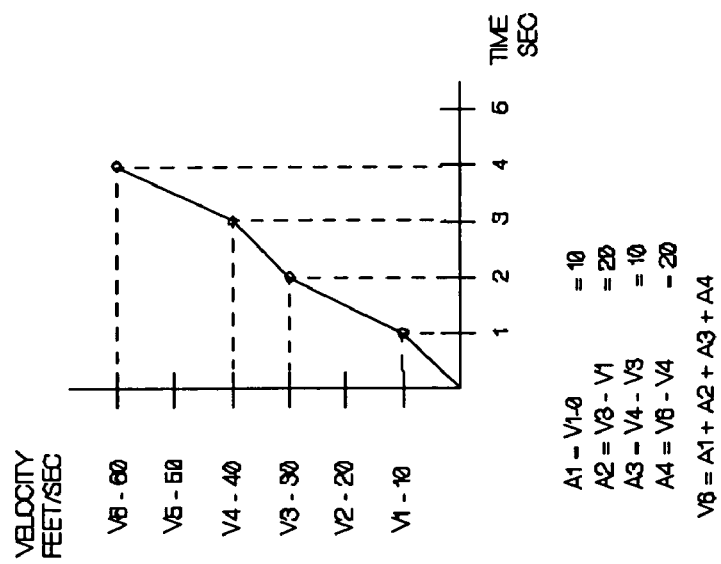

FIG - 17

| | | | | | | | | | | | | |
|---|---|---|---|---|---|---|---|---|---|---|---|---|
| K1 | K2 | K3 | K4 | K5 | K6 | K7 | K8 | K9 | K10 | K11 | K12 | K13 |
| 100 | 80 | 60 | 40 | 40 | 50 | 60 | 60 | 60 | 60 | 50 | 40 | 30 |

INITIAL ACCELERATION (K DECREASING) — DECELERATION — STEADY STATE — ACCELERATION $K(X,Y) = KX - KY$

| K(2,1) | K(3,2) | K(4,3) | K(5,4) | K(6,5) | K(7,6) | K(8,7) | K(9,8) | K(10,9) | K(11,10) | K(12,11) | K(13,12) |
|---|---|---|---|---|---|---|---|---|---|---|---|
| -20 | -20 | -20 | 0 | +10 | +10 | 0 | 0 | 0 | -10 | -10 | -10 |

$SK(X) = SUM \text{ of } K(X,Y) \text{ AT } X$

| SK(2) | SK(3) | SK(4) | SK(5) | SK(6) | SK(7) | SK(8) | SK(9) | SK(10) | SK(11) | SK(12) | SK(13) |
|---|---|---|---|---|---|---|---|---|---|---|---|
| -20 | -40 | -60 | -60 | -50 | -40 | -40 | -40 | -40 | -50 | -60 | -70 |

T16 /\/\ T1    T = K1
T32 /\/\ T17   T = K2
T48 /\/\ T33   T = K3
T64 /\/\ T49   T = K4

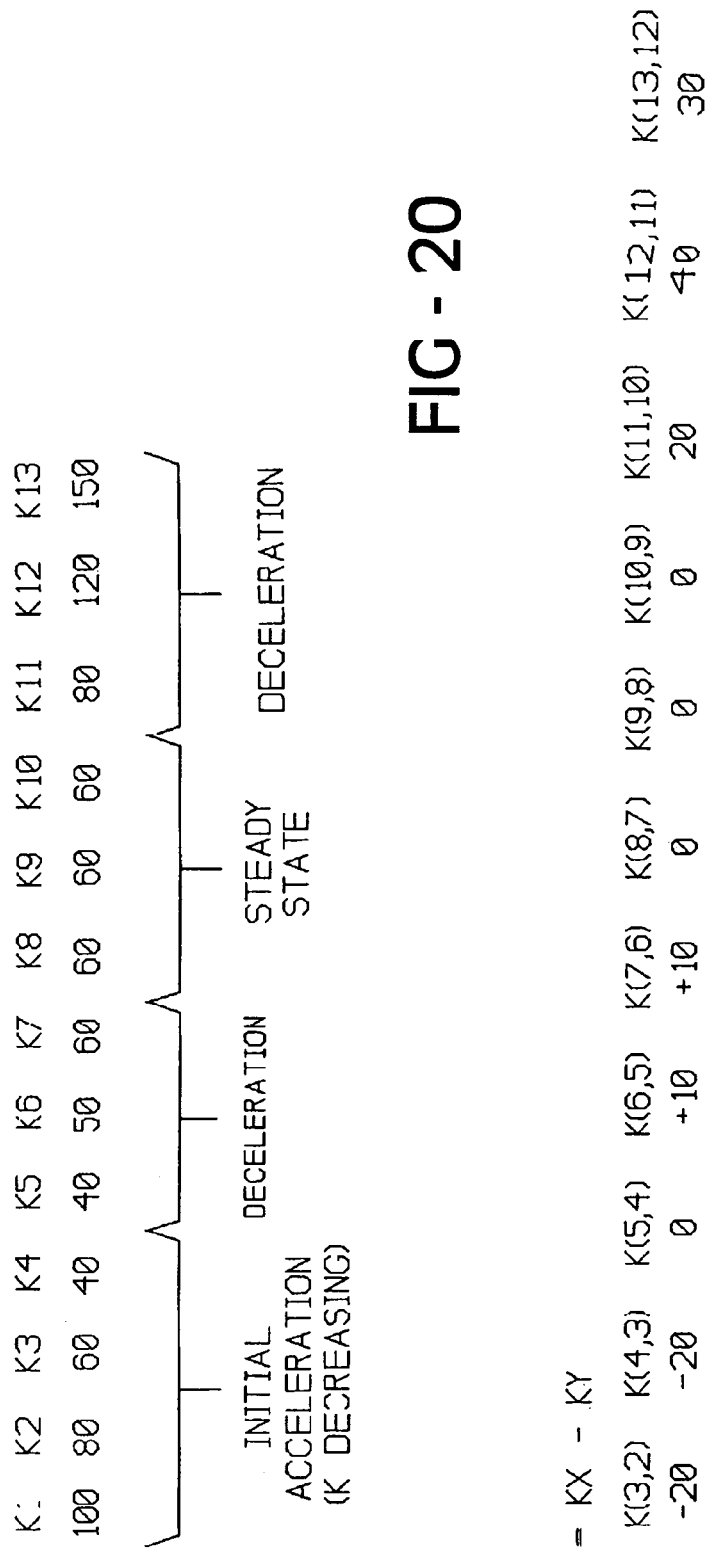

CONTROL FOR ELECTRIC MOTOR IN VEHICLES

RELATED APPLICATION DATA

This application is a continuation-in-part of U.S. patent application Ser. No. 10/720,813 filed Nov. 24, 2003 now U.S. Pat. No. 6,933,694, which is incorporated herein by reference and made a part hereof.

FIELD OF THE INVENTION

The invention relates to control systems for an electric motor in a vehicle, and particularly to control systems which detect obstacles present in the path of a component which is moved by such a motor. For example, the motor may operate a window. If a small child places his hand in the path of the moving window, the invention detects contact of the window with the hand, and stops, or reverses, the window.

In one embodiment, a specific type of computation is undertaken to detect an object in the window's path. A background discussion will first be given on some principles utilized by this computation.

BACKGROUND OF THE INVENTION

FIG. 1 illustrates a motor vehicle 3, which contains a sun roof (not shown) within dashed box 6. FIG. 2 is a view, looking downward, onto the sun roof 9. If, in FIG. 3, an obstruction 10 is present which blocks closure of the glass window 12, motion of the window 12 should generally be stopped, or reversed.

Various stratagems exist in the prior art to achieve this stoppage. Clutches are used, which stop motion of the window 12 when the window 12 strikes the obstruction 10. The obstruction 10 causes an opposing force which overrides the clutch.

Also, sensors are used, which sense the presence of objects in the path of the window 12. Other sensors are used which sense electrical parameters of the motor driving the window. For example, current drawn by the motor can increase when load on the motor increases. Obstruction 10 increases the load, when the window 12 meets the obstruction 10. A system can detect the resulting increase in current, and shut down, or reverse, the motor in response.

In general, assume a sequence of events, and that a certain parameter has a value which can change upon each event. For example, the events may be the passage of units of time, such as one second each, and the parameter may be a velocity or a temperature, which can change every second.

As another example, the events may be individual revolutions of a shaft. The parameter may be speed of the shaft, or the period of revolution of the shaft, which can change every revolution, and each revolution represents one of the events.

Thus, a sequence of parameters P1, P2, P3, etc. has been described, and each parameter is measured every time the event occurs.

Consider the differential between two succeeding parameters, such as (P2−P1). That differential can be normalized, by dividing by a value assigned to the event. For example, if the parameters are velocity, and the event is the passage of one second, the normalization results in the quantity (V2−V1)/(one second). This quantity is the rate of change of speed, or acceleration.

As another example, if the parameters are period T of revolution of a shaft, and the event is one revolution of the shaft, the normalization results in the quantity (T2−T1)/(one revolution). This quantity is the rate of change of period per revolution.

In general, if one begins with a starting value of the parameter, one can compute a subsequent value of the parameter using the differentials and the events, in the following manner:

$$Pf = Pi + dP1(E) + dP2(E) + dP3(E) + \ldots + dPN(E),$$

wherein
Pf is the final value of the parameter,
Pi is the initial value,
dP is the differential between two successive parameters, and
E is the event, in appropriate units.

This type of computation will be elaborated, initially in the context of velocity and acceleration.

A basic velocity equation found in engineering is the following:

$$Vo = Vi + At$$

wherein
Vo is final velocity,
Vi is initial velocity,
A is acceleration, and
t is time.

If acceleration is measured at one-second intervals, then a variation of this equation is the following:

$$Vo = Vi + A1 + A2 + A3 + \ldots + AN$$

wherein
Vo is final velocity,
Vi is initial velocity,
A1 is acceleration for a first one-second period,
A2 is acceleration for a second one-second period,
A3 is acceleration for a third one-second period, and
AN is acceleration for the Nth one-second period.

The Inventor points out that time, t, is not expressly present, because each acceleration occurs over a one-second interval, so that t is unity, and t is not expressed.

FIG. 11 provides an example of the computation. The plot indicates velocity of an object, as a function of time. A1 is acceleration for the one-second period prior to time of 1 second. A2 is acceleration for the one-second period prior to time of 2 seconds, and so on.

The expression for determining velocity at the time of 4 seconds is $$Vf = Vo + A1(t) + A2(t) + A3(t) + A4(t).$$

Since V0 is zero, and t equals unity, the expression reduces to $$Vf = A1 + A2 + A3 + A4,$$

consistent with that given at the bottom of the Figure.

FIG. 11 is framed in terms of a velocity of feet per second. However, the principles just described also apply if velocity is expressed in terms of radians per second, or revolutions per second, as occurs in rotational motion.

FIG. 11 was also framed in terms of an acceleration expressed as the change in speed per second. However, acceleration can also be expressed as a change in speed per revolution. The principles described above also apply in this case, as FIG. 12 indicates. In FIG. 12, the speed is expressed as surface speed of a rotating shaft. But the same computation as described above can be undertaken, as indicated by the equations at the bottom of the Figure.

In the general case, the principles described above can be applied to any time-changing variable. The general framework is to first measure the change in the variable over a standardized interval, or event, such as one second or one revolution. That change is analogous to the acceleration discussed above. Then the following expression is computed:

$$Vf=Vi+A1(t)+A2(t)+A3(t)+A4(t)+\ldots+AN(t).$$

If the variable t (one second or one revolution, for example) has a value of unity, the expression reduces to $$Vf=Vi+A1+A2+A3+A4+\ldots+AN.$$

That is, the final value of the variable V equals the initial value Vi plus the sum of the "accelerations" occurring during each second or each revolution.

FIG. 13 provides an example of the computation. In the Figure, the variable is the period required for the moving body in FIG. 11 to travel one foot. That is, at time 1 second in FIG. 11, the body is moving at 10 feet/sec. That corresponds to a period of 0.1 second per foot, or 6/60seconds in FIG. 13.

At time 2 seconds in FIG. 11, the body is moving at 30 feet/sec. That corresponds to a period of 2/60 second per foot, as indicated in FIG. 13.

For simplicity, assume that the body was moving at 10 feet per second at time zero. This assumption removes the singularity which occurs at the start-up from zero velocity. That is, at zero velocity, a period of infinity exists, which is a singularity. This assumption removes the problems of computation created by the singularity.

In FIG. 13, the "accelerations" will be termed period-accelerations, and given the symbol PA. That is, the acceleration is the change in period, per unit time. PA2 equals the change-in-period during the period ending at 2 seconds, and equals P2–P1, as indicated. PA3 equals the change-in-period during the period ending at 3 seconds, and equals P3–P2, as indicated. PA4 equals the change-in-period during the period ending at 4 seconds, and equals P4–P3, as indicated.

Note that the PA's represent both (1) the differential between subsequent periods and (2) if divided by the quantity one second, which does not change PA, the rate of change in period per second.

Thus, the value of the period at time 4 seconds is computed from the following expression:

$$P4=P1+PA2(t)+PA3(t)+PA4(t).$$

Since t equals unity, the expression reduces to $$P4=P1+PA2+PA3+PA4,$$

which is consistent with the last expression in FIG. 10.

FIG. 14 illustrates how subsequent periods can be computed, using the period at 4 seconds as a baseline. It should be observed that, in expressions such as "P5=1/60+1/60," the first "1/60" represents the value of the initial period, in which the units are seconds. The second "1/60" represents the "deceleration" (ie, negative acceleration) multiplied by a unit of time, with that unit being unity. The units of "deceleration" in this case are seconds/foot per second, or seconds/(foot-second), which equals 1/foot. When that is multiplied by t, the units become seconds/foot, consistent with the units of the period.

In FIGS. 13 and 14, the "deceleration" was measured over intervals of one second. As explained above, the "deceleration" can be measured over other intervals, or events, such as intervals of one revolution. FIG. 15 illustrates a plot of a period plotted against revolutions. The principles described above apply to FIG. 15, but the computations are not shown because they are the same type as in FIGS. 14 and 15.

Therefore, the general procedure is the following. Assume a parameter, or variable, V which changes over time, upon the occurrence of a sequence of events. V is measured at each event. Thus, a string of variables V(1), V(2), V(3), V(4), etc is obtained.

Next, the change in V between successive intervals is computed. This was called "deceleration" earlier, but can also be referred to as a differential, in the calculus sense. In the current example, the differentials are $$D2=V(2)-V(1)$$

$$D3=V(3)-V(2)$$

$$D4=V(4)-V(3)$$

and so on.

Each differential can be divided by the quantity (one event), which will not change the value of the differential, but will convert the differential into a rate-of-change of the parameter, per event. For example, if the parameter is velocity, then one of the differentials may be V2–V1. If that is divided by one second, the quantity becomes (V2–V1)/(one second), which is the rate of change of velocity during that second.

The value of V at any time can be computed by the following expression:

$$Vf=Vi+D2(t)+D3(t)+D4(t)+\ldots+DN(t).$$

Since t equals represents one event, such as one second, this expression reduces to $$Vf=Vi+D2+D3+D4+\ldots+DN.$$

That is, the final value of the variable equals (1) the initial value of the variable plus (2) the sum of the differentials occurring since the initial value. Each differential is implicitly multiplied by a factor of one event, which has the units of seconds, revolutions, or whatever event is being used, and over which the differential was taken.

This type of computation will be explained in the context of the present invention.

OBJECTS OF THE INVENTION

An object of the invention is to provide an improved control system for detecting an obstruction in the path of a component which is moved by an electric motor.

A further object of the invention is to provide an improved control system for electrically actuated windows in motor vehicles.

SUMMARY OF THE INVENTION

One objective of this invention is to define a method to remove the underlying quasi-constant free speed time increment (Tfs)=1/(n*speed), and to ignore subsequent acceleration intervals after the first attainment of the free-running speed during start-up of a motor.

In one form of the invention, a motor is used which reaches different free running speeds in different environments. The invention determines the particular free running speed in a given environment, and then measures speed thereafter to determine whether actual speed drops below the free running speed by a specified amount. If so, it is concluded that the motor has encountered an obstacle, and the motor is shut down or reversed.

BRIEF DESCRIPTION OF THE DRAWINGS

FIG. 4 illustrates one form of the invention.

FIGS. 7 and 8 illustrate graphically data produced by the invention.

FIGS. 9A, 9B, 9C and 10A and 10B are flow charts illustrating processes undertaken by one form of the invention.

FIG. 11 is graph of a computation in accordance with one illustration of the invention.

FIG. 12 is a graph illustrating speed expressed as a surface speed of a rotating shaft.

FIGS. 17 and 20 are figures which illustrates various concepts of the embodiment described.

DETAILED DESCRIPTION OF THE INVENTION

Figure 1:
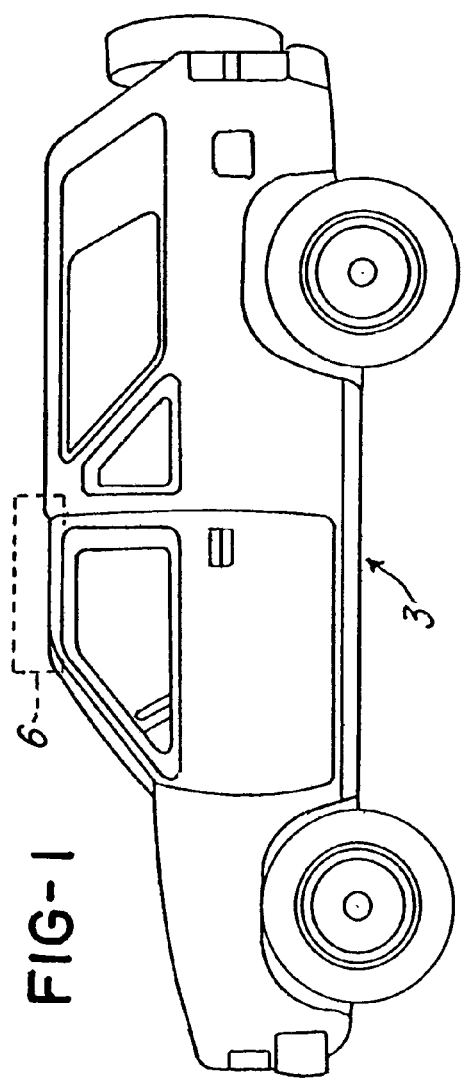
FIG. 1 illustrates a vehicle found in the prior art.
Figure 2:
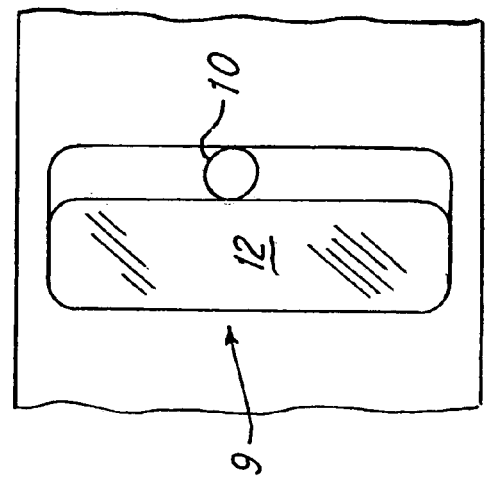
FIG. 2 is a view of the roof of the vehicle of FIG. 2, showing a sun roof 9.

FIG. 4 illustrates one form of the invention. Within magnified insert 30, a window 33 in the form of a sun roof is shown. An electric motor 36, under supervision of a control 39, actuates the window 33. The motor 36 and control 39 are indicated as being located within the roof 42 of the vehicle 45, but other locations are possible.

FIG. 5 shows idealized plots showing speed-time behavior of the motor 36 in FIG. 4, under different combinations of system voltage and temperature.

The system voltage can vary substantially depending on various external effects such as, but not exclusively restricted to, climatic conditions (temperature, humidity, etc.) and vehicle running conditions (running at speed, idling, stopped, etc.). The system voltage, for the purposes of this invention, can therefore effectively vary from 0V for a flat battery up to approximately 16V depending on the voltage regulator.

Additionally, the resistance loads (friction, drag, etc.) applied to the system will vary depending on numerous phenomena such as, but not limited to, the change of material characteristics (stiffness, flexibility, contact friction, etc.) at low and high temperature, the relative expansion of different materials creating increased or decreased resistance due to variable interference, etc.

For the purposes of this invention, the variability of system voltage and system resistance loads need not be assumed to either increase or decrease in any particular manner in relationship to the external influences. However, it is assumed that the particular system under consideration at any one time will for a particular voltage level and corresponding temperature level, result in a stable velocity (free running speed) after an initial transient start-up time.

The system voltage can assume rather widely differing values. For example, when the engine (not shown) of the vehicle 45 is not running, the system voltage will correspond to the voltage of the battery (not shown), which will ordinarily be about 12 volts, for a healthy battery.

However, when the vehicle 45 is running, the system voltage will be dictated by the voltage regulator of the charging system (not shown), and that voltage is generally around 16 volts, for a passenger car in the United States in the year 2003.

Further, if the vehicle 45 is not running, and the battery has been subject to very cold conditions, the battery voltage may fall below 12 volts.

Further still, the cold temperature drastically reduces the rate of reactions within the electrochemical cells of the battery, so that, even if the measured battery voltage is 12 volts, the amount of current which the battery can deliver is significantly reduced.

From another point of view, the cold temperature increases the internal resistance of the battery. The battery can be modeled as an ideal voltage source 50 in series with that internal resistance 53, as shown in FIG. 5. When that resistance increases, any current drawn from the battery, as by running motor 36 in FIG. 4, causes a voltage drop across the resistor 53, thereby reducing the voltage at point P, which is the terminal voltage of the battery.

Therefore, for various reasons, the voltage which the battery of the vehicle 45 produces changes under different operating conditions.

Another factor affecting performance of motor 36 is the ambient temperature. For example, at warm temperatures, such as 85 F, lubricants are relatively soft. Gaskets and water seals, which surround window 33 in FIG. 4, are pliant and flexible, and so on. However, at cold temperatures, such as 10 F, lubricants become stiffer. This increased stiffness causes bearings which motor 36 in FIG. 4 must rotate to offer more resistance, or drag. Also, gaskets and water seals become stiffer, thus applying drag to the window 33.

Therefore, for various reasons, at low temperatures, the motor 36 in FIG. 4 faces a higher load, or drag, than at high temperatures. FIG. 5 illustrates this in a qualitative way.

Plot 60 in FIG. 5 illustrates acceleration of a generalized motor at high temperature, and at high system voltage. Plot 60 would apply, for example, on a hot day of 90 F, when the engine of the vehicle 45 in FIG. 4 is running. The motor accelerates from a stop, to a free running speed, which it reaches at time T1.

Free running speed refers to the speed which the motor attains at its normal load. For example, motor 36 in FIG. 4 would reach a certain free running speed when it opens, or closes, window 33.

Plot 70 in FIG. 5 illustrates acceleration of a generalized motor at low temperature, and at low system voltage. Plot 70 would apply, for example, on a cold day of 10 F, when the engine of the vehicle 45 in FIG. 4 is not running. It is observed that the motor reaches a free running speed which is less than that of plot 60. Further, it may happen that the free running speed in plot 70 is reached at a later time T2, than is the case in plot 60, where the free running speed is reached at time T1.

Two other situations are possible: (1) High system voltage with low ambient temperature and (2) low system voltage and high ambient temperature. In these two cases, motor performance can be expected to lie within an area bounded by the curves of plots 60 and 70. Hatched areas 80 and 85 represent those areas.

Therefore, FIG. 5 illustrates that the free running speed of a motor within vehicle 45 in FIG. 4, including motor 36, can be expected to change, depending on system voltage and ambient temperature. This can create problems when one attempts to infer the presence of an obstruction which alters speed of the motor, by computation based on speed of the motor.

For the purposes of this invention, it is assumed that some form of sensing device (Hall, potentiometer, etc) can measure the incremental time interval between adjacent poles of an adequate number (usually, but not restricted to, 2 to 16) of equally spaced poles or teeth around the system motor drive shaft. For example, in the case of a 16 pole sensor, the time increment for each of the 16 consecutive 1/16 of a revolution is stored for later post-treatment.

For example, it is common to measure speed of the motor by attaching a toothed wheel to the motor. Assume a wheel having 16 teeth. A sensor is placed adjacent the toothed wheel, and each tooth induces a pulse in the sensor. In this example, 16 pulses are produced per revolution. Measuring the time required to produce 16 pulses thus indicates the time to achieve one revolution and a simple computation gives motor speed in rpm.

Figure 3:
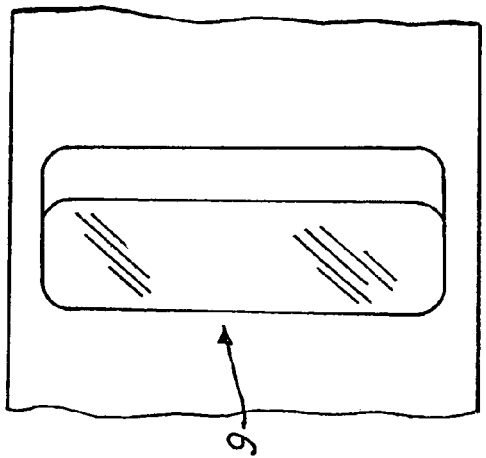
FIG. 3 shows an obstacle 10 in the path of window 12 in the sun roof 9 of FIG. 2.

However, motor speed is not constant, and depends on factors such as system voltage and ambient temperature, as FIG. 5 indicates. Of course, one can detect the situation wherein the motor 36 strikes an immovable object, as when a concrete block, or other very hard, stiff, object takes the position of obstruction 10 in FIG. 3: motor speed drops to zero. That drop, in general, is easily detected.

Nevertheless, less extreme situations pose problems. Suppose that obstruction 10 takes the form of a soft sponge, or a child's hand. The speed behavior of FIG. 5 indicates that detection of this type of obstruction may be difficult, or at least fraught with problems.

The invention eliminates, or reduces, these problems, as will now be described.

As previously explained, multiple time increments corresponding to the number of teeth around the system motor shaft, are recorded (e.g. for a 16 pole sensor, 16 time increments are recorded corresponding to 1/16 of a revolution of the motor shaft). These time increments are defined to be Ti.

It can be seen that various of Ti is inversely proportional to the motor shaft speed.

A simple form of filtering is employed to removed, among other effects but not restricted thereto, the influence of manufacturing tolerances on the relative circumferential positioning of the multiple poles of the sensor. After the completion of one full revolution, and thereafter for each incremental part of a revolution (1/n revolution), the instantaneous time increment (Tf(k)) is calculated to be the average of the sum of previous "n" time increments Ti as indicated by Equation 1 in FIG. 6, where n=the number of sensor poles or teeth.

Figure 5A:
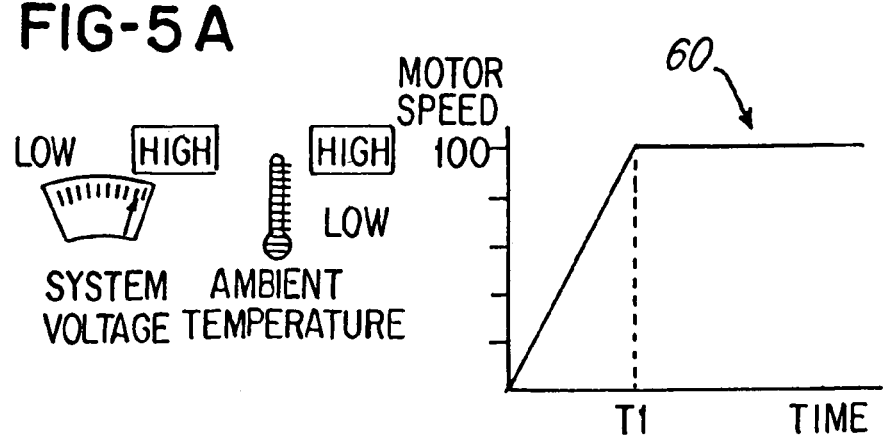
FIGS. 5A–5D illustrate four different combinations of temperature and system voltage under which the motor 36 of FIG. 4 can operate.
Figure 5B:
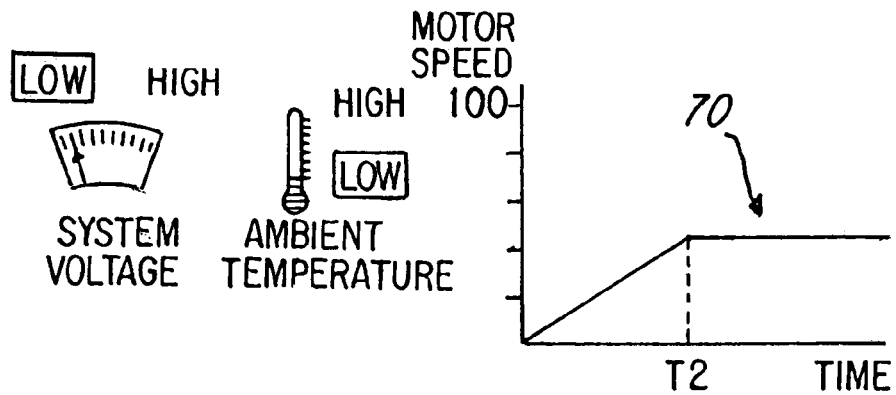
Figure 5C:
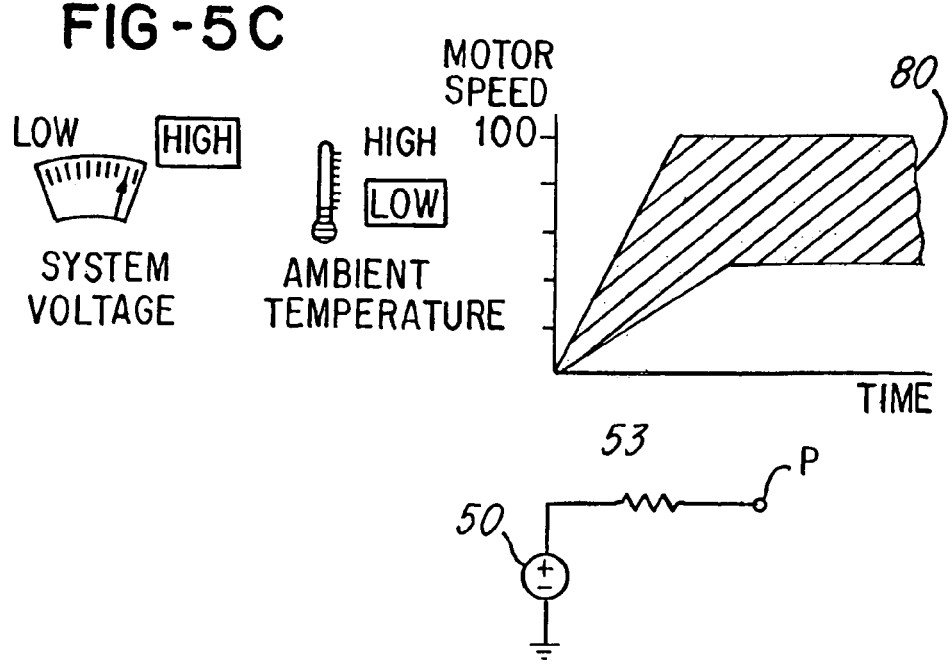
Figures 5D, 6:
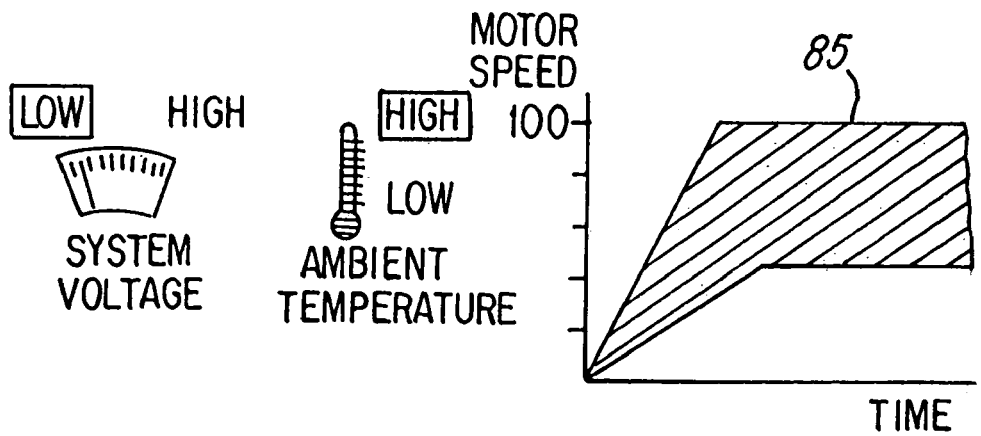
FIG. 6 illustrates equations utilized by the invention.
Figure 15:
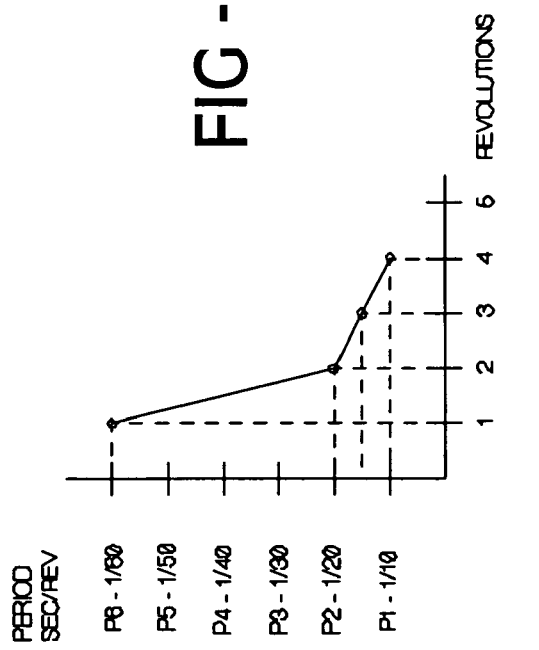
FIG. 15 is a graph illustrating the plot of a period plotted against revolutions.

At any instant in time the derivative of the time increment Tf(k) can be calculated according to Equation 2 in FIG. 6. Additionally, at any instant in time the integral of the summation of the derivatives of the time increments ((T(x)), which we will subsequently refer to as the Relative Speed (RS), can be defined according to Equation 3 in FIG. 6.

It can be seen that at start-up the motor will accelerate (T(x) negative) from a stationary condition (T(I)infinite) towards a nominal free speed, corresponding to the prevailing operating conditions of the system. During this start-up phase the derivative of time increments (T(x)) will progressively decrease in magnitude (being negative) towards a theoretical value of zero (corresponding to a constant non-fluctuating speed).

The start-up phase is considered to have ended when the first time increment (T(x)) exhibits a value of zero, or a positive value is obtained, corresponding to either an effective stabilized speed or an actual deceleration point. Alternately, the start-up phase can be considered as ended when three consecutive increments exhibit a value of zero. At this point in time a variable defined as Trs is set to be zero.

The variable Trs measures the resulting summation of the time increment derivatives ((T(x)) as follows:
a) in all cases when they have a positive value
b) when negative whilst the on going Trs summation remains larger than the negative ((T(x)) value.

Note: Trs has a minimum absolute value of zero. In the event of a negative (T(x)) value greater than the positive current Trs, Trs is set=zero. Trs remains at zero until positive values of (T(x)) are measured again.

It can be seen that Trs is a measure of the effective deceleration of the system under consideration with relationship to its steady state speed condition. The resulting variable Trs can now be used to evaluate the relative importance of a significantly lengthy deceleration phase, which can subsequently (based on prior characterization of the system in question subjected to different obstructions and operating conditions) be deduced to be contact with an obstacle in the system.

Calculation # 1:

Calculate the derivative of a signal then integrate the resulting data samples, using Equation 4 in FIG. 6.

The resulting output from the Equation will be exactly equal to the input signal (Tres(t)=Tf(t)) if the two following conditions are present:
the initial conditions are respected IC=Tf(x=0)
the signal has an absolute value (can be negative)

Principal notion utilized in the "relative speed" calculation
Apply the calculation #1 with the following restrictions:
Condition 1 (C1): Calculate Tres(x) starting with an initial condition of zero (CI=0)
Condition 2 (C2): Saturate Tres(t) at zero (negative values or not allowed)

Equation 5 in FIG. 6 illustrates the preceding.

Resulting effect on the signal Tf(k) as presented in Equation 1: The complete start-up transient is removed from the signal when the initial conditions are zero and the negatives values are saturated at zero, as illustrated in FIGS. 7 and 8.

The invention provides the following advantages.

ADVANTAGE 1:
The quasi-steady state component Delta Tf is removed from the original signal
The dynamic component of the signal (seen in the S2 phase of the signal) is completely retained ADVANTAGE 2:
The signal calculated Trs(f) remains almost zero, irrespective of the prevailing operating conditions voltages, temperature, etc.), even though a different quasi-steady state free speed will be attained (seen in the S1 phase of the signal of FIG. 8).

ADVANTAGE AV3:

The signal to noise ratio is always greater than 2, which allows the detection of even very hard/stiff obstacles (65 N/mm) with a acceptable load (100N), whilst avoiding incorrect obstacle detection due to system "noise" (high frequency low amplitude fluctuations).

FIGS. 9A–10B are flow charts illustrating processes undertaken by one form of the invention. In overview, the invention first determines a normal speed, or free running speed, of the motor in question. That normal speed may be 3600 rpm, or 100 inches per minute, for example.

It is emphasized that this normal speed is not an eternal constant, but will depend on prevailing environmental conditions, as FIG. 5 indicates. That is, the invention adaptively derives the normal speed.

Then a limit is imposed. The limit may state that speed may not drop by 100 rpm or, equivalently, may not drop to 3500 rpm, or may not drop to 99 inches per minute, and so on.

The invention inquires whether speed has dropped below the limit. If so, it is assumed that an obstacle has blocked the motor, and corrective action is taken, as by stopping, or reversing, the motor.

In another embodiment, the limit is adjusted, based on operating conditions. At high ambient temperature, the limit may be reduced, for example, thus causing a smaller decrease in speed to indicate an obstacle.

In another embodiment, false positives are eliminated. If a sufficient drop in speed is detected, the inquiry is repeated to see if a repeated inquiry will also detect a sufficient drop. If a sufficient number of inquiries successfully detect a drop, then an obstacle is declared to be present.

This discussion will explain FIGS. 9A, 9B, 9C, and 10A and 10B in greater detail.

In FIG. 9A, block 100 indicates that the control 39 in FIG. 4 inquires whether free running speed of the motor 36 has been attained. This inquiry asks whether the motor has reached operating region 103, in plot 105.

From one point of view, block 100 is asking whether motor 36 has completed its initial acceleration.

One approach to implementing the process of block 100 is the following. Assume that the toothed wheel discussed above is used to measure speed. The time required to produce 16 pulses is measured, and is taken as the time for one revolution. (In general, individual pulses are not used, because the tooth spacing of the wheel is not always perfectly uniform. Thus, during one revolution at constant speed, a long pulse may be followed by a short pulse. If individual pulses were used, those two pulses would indicate a speed change, when no speed change actually occurred.)

If the motor is accelerating, the time required for the next 16 pulses will be less. So long as the measured time per revolution is decreasing, that is, the measured time for each successive group of 16 pulses is decreasing, it is assumed that the motor is accelerating. But when the measured time stops decreasing, it is assumed that free running speed is attained.

Of course, other approaches can be used to determine when the motor reaches free running speed.

At this time, when free running speed is attained, block 110 in FIG. 9A declares that event, and sets a baseline speed. This baseline speed acts as a reference point. The free running speed can be used as the baseline. Alternately, zero, or another baseline, can be declared. The baseline acts as a reference point, so that subsequent changes in speed can be measured relative to the baseline.

For example, assume that free running speed is 100 rpm, and that 100 rpm is the baseline. If a deceleration to 98 rpm occurs, a computation can indicate that a change of negative 2 rpm occurred.

As another example, assume the same free running speed, but that the baseline is set to zero. Assume that speed is not computed directly, but that the time for groups of 16 pulses is used to indicate speed. If the measured time for 16 pulses then increases, as occurs when deceleration occurs, the increase is recorded. If the increase continues to occur, the total increase will eventually exceed the baseline limit, although in units of time, as opposed to units of rpm.

Therefore, the baseline serves as a reference point. The units chosen, such as rpm or pulse time, as well as the value of the baseline, are under control of the designer. Some choices may simplify computation, but, again, the baseline acts as a reference to detect drops in speed.

Block 115 then inquires whether any drop from the baseline speed has occurred. For example, if the motor's time-speed trajectory followed dashed path 120 in plot 125, then a drop of 20 units in speed would occur. Block 115 detects this 20 unit drop.

This drop can be detected in the following manner. Assume that motor speed has stabilized, and that 1/60 second is required to receive 16 pulses, corresponding to a motor speed of one revolution every 1/60 second, or 60 revolutions per second, or 3600 rpm.

In concept, one may determine whether the motor experiences a deceleration by asking whether more than 1/60 second is required to receive subsequent groups of 16 pulses. If not, then no deceleration is detected. If so, then a deceleration does occur, indicating the possibility that an obstruction is hindering rotation of the motor.

The Inventor points out that block 115 does not look for acceleration in the motor, but only deceleration.

In FIG. 10A, block 200 sets a deceleration limit. This limit could have been set previously, or it could have been fixed in advance by the system designer. One concept behind the deceleration limit is to detect decelerations which are deemed to be caused by obstructions which required shutting down the motor. The deceleration limit, for example, may state that the 20 unit drop in FIG. 9C is excessive.

Block 205 in FIG. 10A inquires whether any drop, computed in block 115 in FIG. 9, exceeds the deceleration limit of block 200. For example, in plot 220, dashed line 225 represents the deceleration limit. Line 230 represents the baseline speed. Dashed line 120 represents a drop in motor speed. Block 205 inquires whether the drop 120 in motor speed exceeds the deceleration limit.

If so, indicating that motor speed has fallen sufficiently, thereby indicating that an obstruction has been struck, then the YES branch is taken, and block 210 shuts off the motor, or takes other corrective action, such as reversing the motor.

If not, indicating that no excessive deceleration has been detected, the NO branch is taken, and the processing returns to block 115 in FIG. 9, and repeats.

A significant feature is that, in one form of the invention, the deceleration limit, indicated by double arrow 233 in FIG. 10, is an absolute number, as opposed to a percentage. Thus, if the baseline speed changes to baseline speed 230A, the deceleration limit 233 remains the same.

From another point of view, the deceleration limit represents a number N. The invention inquires whether speed has dropped below (baseline speed minus N). If so, it is assumed that an obstacle has been struck, and corrective action is taken.

The Inventor points out that the approach of FIGS. 9 and 10, in effect, computes a relative speed, relative to the baseline. If the relative speed indicates an excessive deceleration, corrective action is taken.

In another form of the invention, the baseline is adaptive, and is not an absolute number. That is, if the motor behavior corresponds to that shown in plot 60 in FIG. 5, then the free running speed is that attained at time T1. That speed can be used as the baseline speed. However, if the motor behavior corresponds to that of plot 70 in FIG. 5, then the free running speed is that attained at time T2. That speed can be used as the baseline speed.

Similar comments apply to operation in regions 80 and 85.

It is noted, the baseline speed is different in the two situations. Further, the difference was not determined in advance, but was derived in real time, based on the free running speed attained in each instance.

Thus, from one point of view, the invention detects the free running speed attained by the motor. This free running speed can be called normal operating speed. The invention then sets a deceleration limit, such as limit 233 in FIG. 10B. This limit is determined with respect to the free running speed, and is not, in general, an absolute speed.

The invention inquires whether current operating speed falls below the deceleration limit. If so, then an obstacle is assumed present, and corrective action is taken, such as shutting down the motor, or reversing the motor.

Phantom block 300 in FIG. 10A represents optional processes which can be added. For example, the deceleration limit 233 can be altered during operation of the motor. Assume that system voltage increases during operation of the motor. In this case, the deceleration limit can be decreased. Thus, with a higher system voltage, a smaller deceleration, or a smaller decrease in relative speed, will be taken to indicate presence of an obstruction.

As another example, ambient temperature can change during operation of the motor. The deceleration limit can be decreased in response to the change. Thus, with a higher ambient temperature, a smaller deceleration, or a smaller decrease in relative speed, will be taken to indicate presence of an obstruction.

The change in deceleration limit need not occur during operation of the motor, but can be taken on start up. For example, if the motor starts under the conditions shown in plot 60 in FIG. 5, one deceleration limit can be used. If the motor starts under the conditions of plot 70, another deceleration limit can be used. In either case, the deceleration limit used can be changed, if the environmental variables, such as system voltage and ambient temperature, change.

In another form of the invention, a single excursion past the deceleration limit is not seen as conclusively indicating the presence of an obstruction. Instead, when such an excursion occurs, the invention notes that excursion, and then repeats the inquiry of block 205 in FIG. 10A a specified number of times, such as three or four.

If those repeated inquiries indicate that the deceleration limit is truly exceeded, then an obstruction is taken as present. Numerous approaches can be taken. It may be required that all of the ten inquiries indicate that the limit is exceeded. It may be required that a majority of the ten inquiries so indicate, and so on.

This repeated inquiry serves to eliminate false positives.

Figure 16:
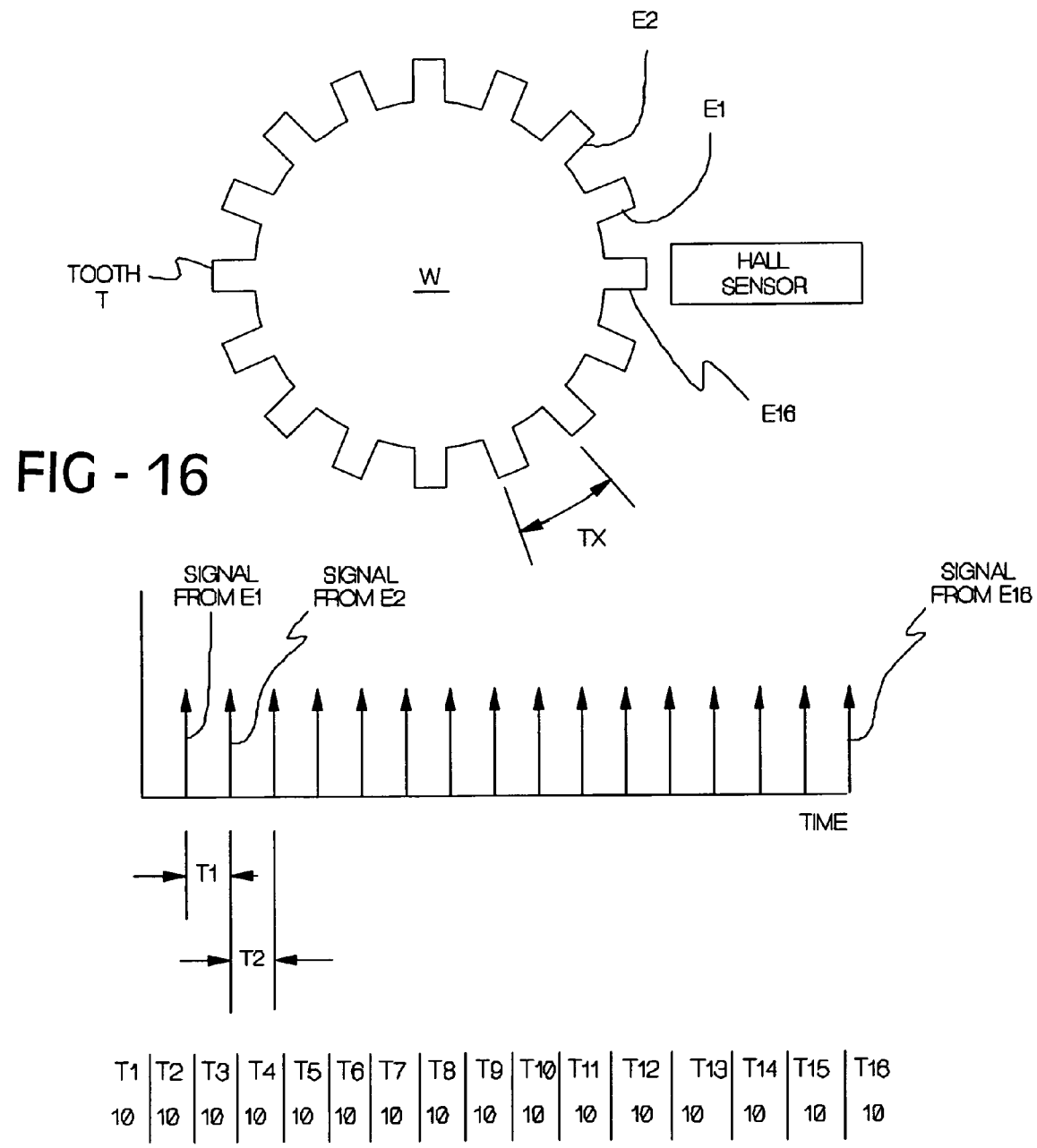
FIG. 16 illustrates a toothed wheel which is driven by a motor and which drives a window.

FIG. 16 illustrates a toothed wheel W, which is driven by the motor (not shown), which drives the window (not shown). One tooth T is labeled on the wheel W, and each tooth has an edge, three of which are labeled E1, E2, and E16. As each tooth passes a HALL SENSOR, known in the art, it produces a pulse.

The central part of the Figure illustrates a pulse train produced during one revolution of the wheel W. Time intervals, such as T1 and T2, correspond to the time between the edges of the teeth, and one such time interval is labeled TX at the top of the Figure.

Exemplary pulse-train data is given at the bottom of the Figure. The top row identifies each tooth. The bottom row indicates the time interval between that tooth, and the immediately preceding tooth, in milliseconds. For example, the "10" under "T1" indicates that 10 milliseconds elapsed between the crossing of the edge of T16 past the HALL SENSOR and the crossing of the edge of T1.

Figure 13:
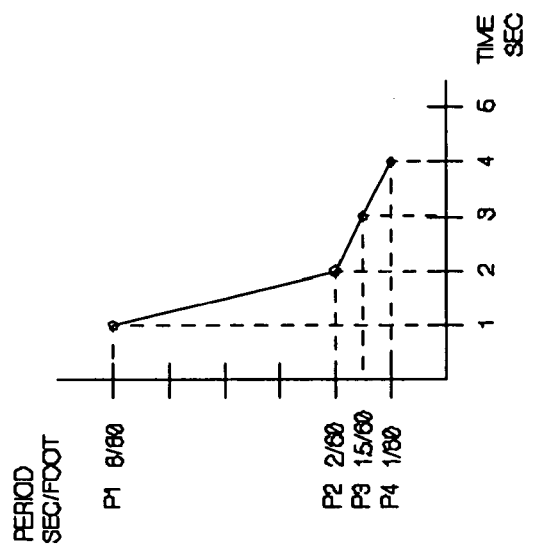
FIG. 13 is a graph showing another example of the computation.
Figure 14:
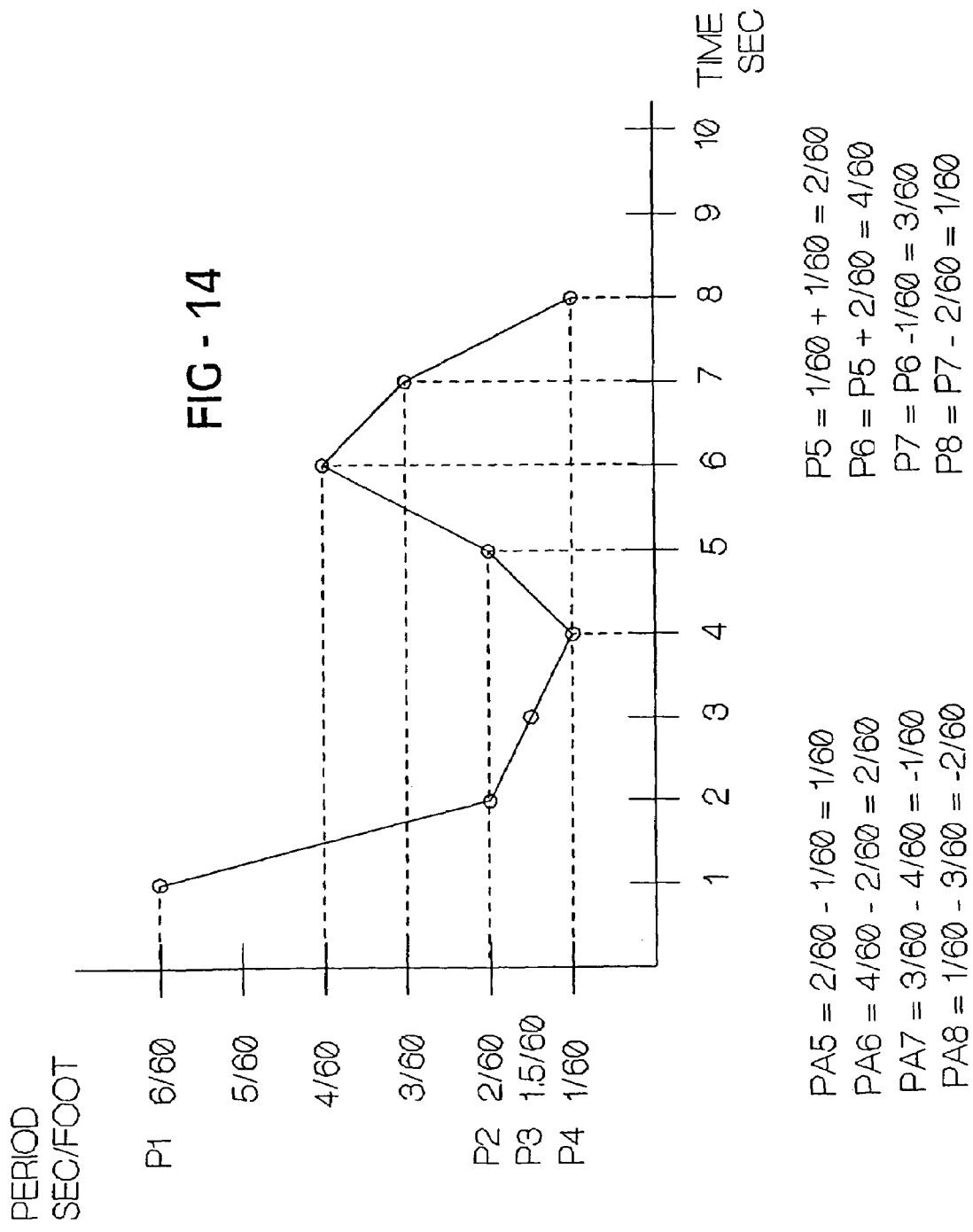
FIG. 14 is a graph illustrating a plurality of periods computed using a period at 4 seconds as a baseline.

In this particular example, 160 milliseconds are required for a single revolution, corresponding to a wheel speed of 1/(0.16), or 6.25 revolutions per second, corresponding to 375 rpm. In general, actual motor speeds are much higher, in the range of 3,000 rpm. The numbers illustrated in FIG. 13 are chosen for simplicity in computation.

A parameter K is computed, as indicated in FIG. 17, left side. Depending on the particular equations used by the designer, K may be normalized to produce units in K logically consistent with the limits with which K is compared. The discussion in the Background explains the concept, particularly in the discussion of the implicit limits of one second, and so on. Also, as will be seen, K, as explained in these examples, indicates the time for one revolution. It is the time period per revolution. For convenience, K may be converted to another quantity, such as speed.

In general, K is the time required for a predetermined number of pulses to occur. In FIG. 17, that predetermined number is 16, corresponding to one revolution. Thus, K1 is the total time required for pulses T1 through T16 to occur, as indicated. K2 is the total time required for pulses T17 through T32 to occur, as indicated. K3 is the total time required for pulses T33 through T48 to occur, as indicated. K4 is the total time required for pulses T49 through T64 to occur, as indicated. And so on.

The example given computes a new K at the start of every revolution. This example is given for ease of explanation. In a preferred embodiment, a new K is computed as each pulse arrives. In this preferred embodiment, K1 would be computed as the sum of T1 through T16. K2 would be the sum of T2 through T17. K3 would be the sum of T3 through T18. K4 would be the sum of T4 through T19, and so on.

In both the preferred embodiment and the previous example, a sliding window is used, which conceptually slides along the plot at the bottom of FIG. 16. The sliding window is 16 pulses long, and is used to measure the total duration of the 16 pulses. In the preferred embodiment, the left side of the window steps from 1 to 2 to 3, and so on, in incremental steps, and the window captures pulses 1–16, 2–17, 3–18, and so on.

In the previous example, the left side of the window steps from 1 to 17 to 33, and so on, and the window captures pulses 1–16, 17–32, 33–48, and so on. Thus, the choice of stepping, in effect, determines whether K is determined every 1/16 revolution, 2/16 revolution, every revolution, and so on. The window, as will be seen, is used to compute an average period, or speed, over the window's span. Whether the left side of the window steps as 1, 2, 3, etc. or 1, 16, 33, etc. simply determines how often the average is computed.

The K's indicate average period of each revolution. The average is taken because, even at constant speed, spacing between the pulses can change during a revolution because of nonuniformities in the tooth spacing on the wheel W in FIG. 16. Also, in fact, small accelerations and decelerations can occur in the motor during each revolution, producing nonuniform speed of wheel W.

Of course, the K's can be averaged over other intervals beside single revolutions.

The top of FIG. 17 indicates a sequence of K's. K1 through K4 indicate an acceleration: the time for each revolution progressively decreases. Each decrease indicates an increase in speed of wheel W. K4 and K5 indicate a constant speed of wheel W for two revolutions.

K5 through K7 indicate a deceleration: the time for each revolution progressively increases. Each increase indicates a decrease in speed of wheel W. K8 through K10 indicate steady-state operation: wheel speed is constant. K11 through K13 indicate an acceleration.

The embodiment under consideration seeks to identify the steady state condition shown, that is, the condition occurring during K8 through K10. This is accomplished through the following computation.

The central part of FIG. 17 illustrates a computation of the parameter K(X,Y), which is the difference between two adjacent K's. For example, K(2,1) equals K2 minus K1. Since K2, at the top of the Figure, equals 80 and K1 equals 100, K(2,1) equals negative 20, as indicated in the central part of the Figure.

It can be seen that, during an acceleration, K(X,Y) is negative. The reason is that acceleration implies that the K's decrease as time progresses. Since K(X,Y) requires subtracting a later value from its immediately preceding neighbor, and since the later value will be less than the preceding neighbor, K(X,Y) will be negative during accelerations.

For a similar reason, K(X,Y) will be positive during decelerations, as K(6,5) and K(7,6) indicate.

Also, K(X,Y) will be zero during steady-state operation, because the K's do not change during steady-state operation.

The bottom of FIG. 17 illustrates another computation, which is a summation of the K(X,Y)'s. The summation is labeled "SK(X)," wherein "S" refers to summation.

SK(X) is the cumulative summation of K(X,Y) at time X. For example, SK(2) is the sum of the single value K(2,1), which is negative 20. SK(3) is the sum of K(2,1) and K(3,2), which is negative 40. And so on.

It is observed that the K(X,Y)'s act as the differentials discussed above. SK(X) is a summation of differentials, which is like an integration of the differentials. If one starts with an initial period, such as that indicated by K6 at the top of FIG. 17, and one adds subsequent K(X,Y)'s, one obtains the period occurring at the end of the subsequent K(Z,Y)'s.

One reason is that each K(X,Y) can be treated as the rate-of-change of period occurring during one revolution. Each K(X,Y) is implicitly multiplied by one revolution. Thus, the summation represents the total change in period over the K(X,Y)'s summed.

The invention utilizes this summation as follows.

Figure 18:
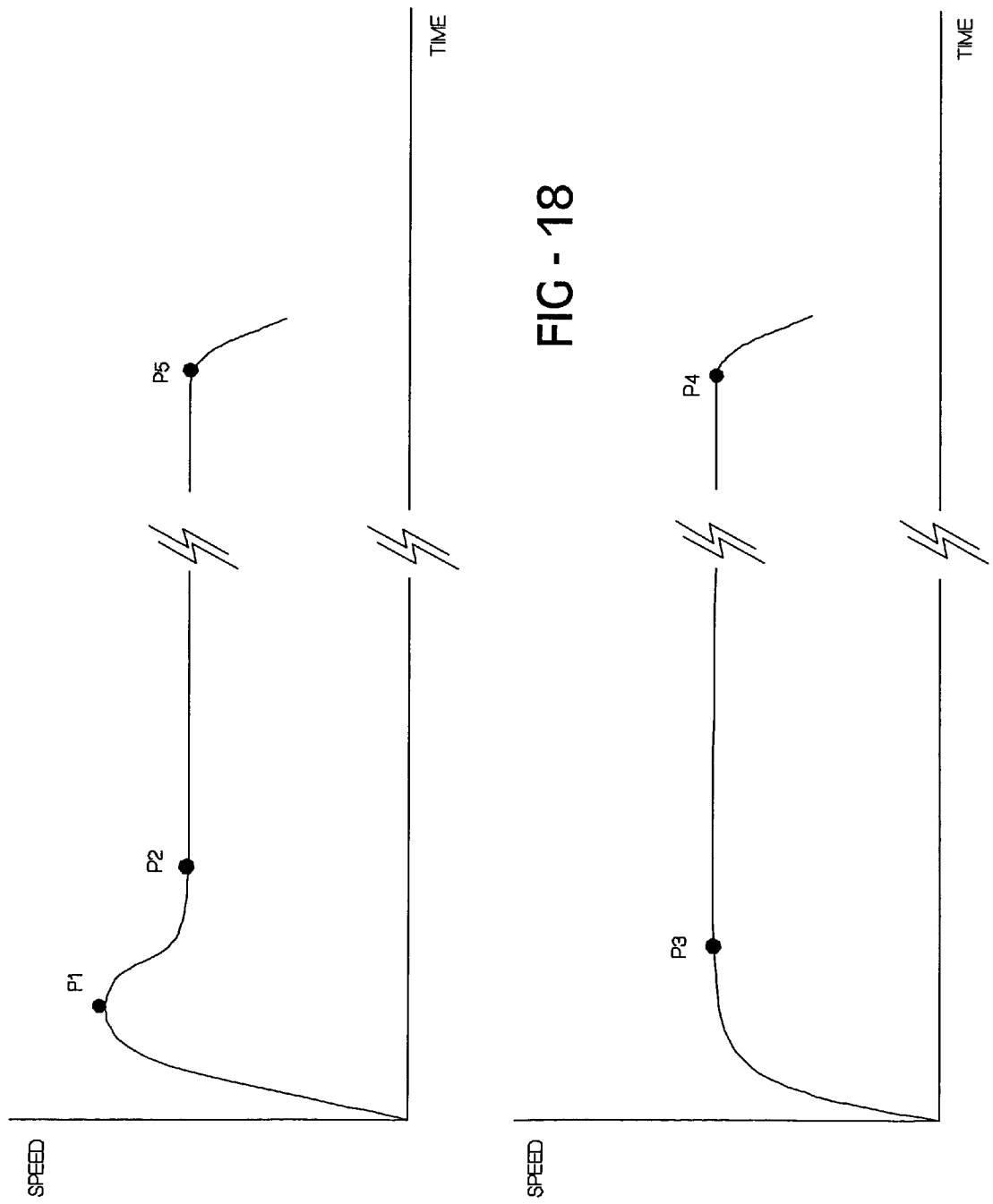
FIG. 18 illustrates two types of start-up transients in motor speed.

FIG. 18 illustrates two types of start-up transients in motor speed. Other types of transient are possible. In the upper plot, it is seen that acceleration occurs up to point P1, followed by a deceleration to point P2, and then constant operation to point P5.

Initially, up to point P1, the K's will be negative, because acceleration is occurring. Then, during the period from P1 to P2, wherein a deceleration occurs, the K's will turn positive. At this time, or after a brief specified time interval, such as 10 milliseconds, the sum SK(X) is set to a baseline value, such as zero, and the summing commences. For the reasons explained above, the running sum will provide the current period for one revolution of the wheel W. Of course, the inverse of that period indicates the speed of the wheel W, in revolutions per second.

Inquiry is made whether the running sum SK deviates from the baseline value by a predetermined amount. If so, a blockage of the window is presumed, and the motor is either reversed or shut down.

It is possible that the start-up transient is different from that just discussed, and may resemble that in the bottom plot of FIG. 18, wherein an acceleration occurs to point P3, followed by constant speed to point P4.

In such a case, steady-state speed can be inferred when the succession of K's attains a value of zero for a specified time.

Figure 19:
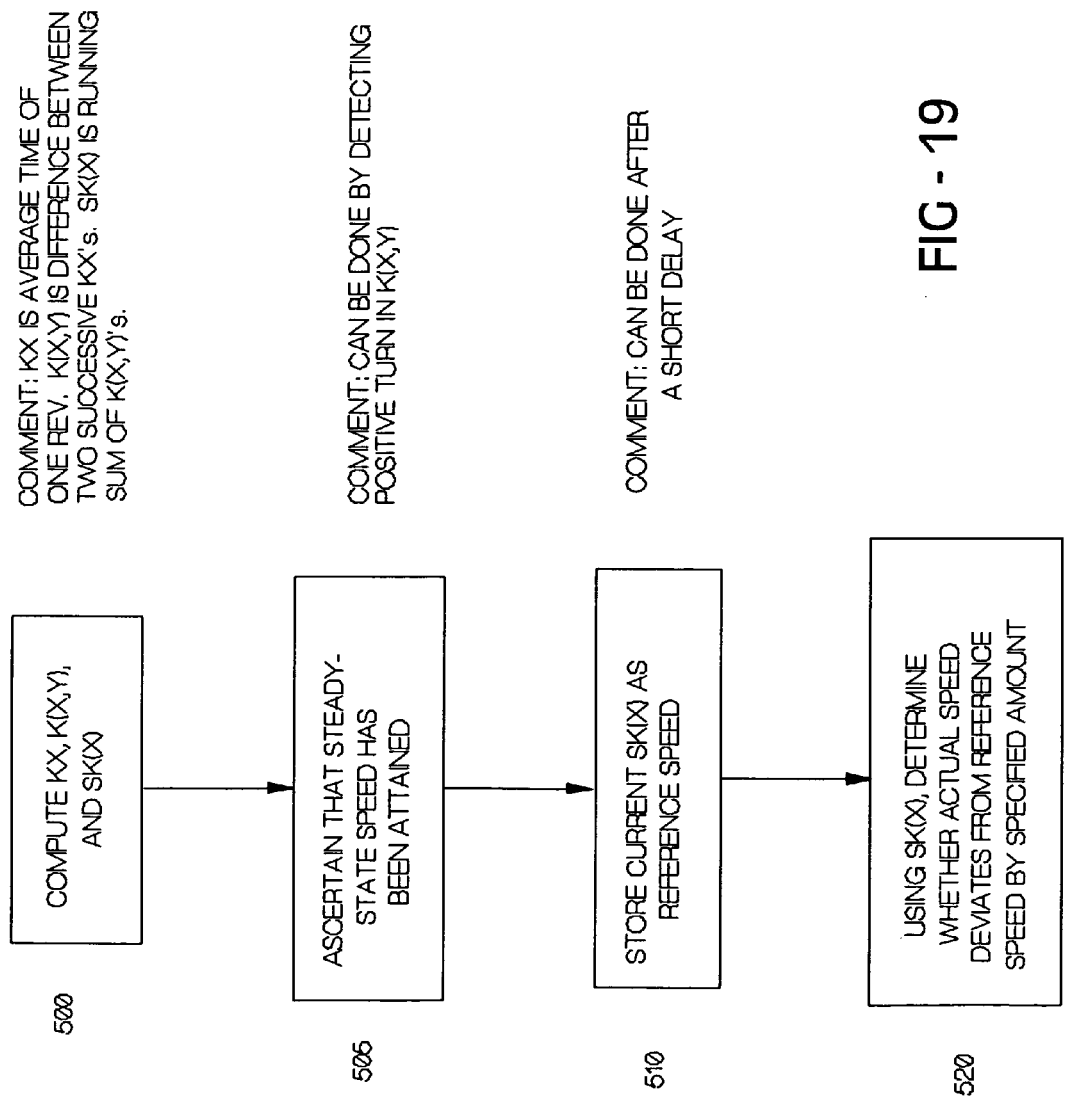
FIG. 19 is a flow chart illustrating logic implemented by one form of the invention.

FIG. 19 is a flow chart illustrating logic implemented by one form of the invention. In block 500, KX, K(X,Y), and SK(X) are computed, as described above.

In block 505, a determination is made that that steady-state speed, or free-running speed, has been attained. This can be done by determining when KX attains a sustained value of zero. This can also be done by determining when K(X,Y) turns positive (or negative) for an Nth time. For example, in FIG. 18, top, two inflections of K(X,Y) occur: one prior to P1, and one between P1 and P2. Since K(X,Y) is analogous to slope of the plot, the change at P1 will be indicated as a change in sign in K(X,Y). Thus, for this plot, when K(X,Y) trends positive for the first time, that trend is taken as indicating the onset of steady-state speed, or free-running speed.

In other situations, multiple oscillations between positive and negative slope can occur prior to reaching free-running speed. In such a case, the designer will select how many changes in the sign of K(X,Y) are required to indicate the attainment of free-running speed.

Block 510 indicates that the current value of SK(X) is stored at this time. SK(X) is a running sum of the K(X,Y)'s, and represents the current time period for one revolution. The COMMENT indicates that the storage may be done after a short time delay. This delay allows speed to stabilize. In general, delays of ½, 1, 2, 3, 4, or 5 revolutions are specifically contemplated.

Block 520 indicates that current SK(X) is compared with the stored value. In effect, this compares the current time period for one revolution with a reference value. If the current time period deviates from the reference value by a predetermined amount, then it is concluded that the motor has decelerated significantly, because of interference by a foreign object. The motor is reversed or shut down.

In another embodiment, a requirement can be imposed that the deceleration indicated by block 520 persists for a certain length of time before shutdown.

Detection of a deceleration can be explained with reference to a Figure similar to FIG. 17. Assume that, at the top of FIG. 17, K11, K12, and K13 are replaced with the following values: K11=80, K12=120, K13=150. This is shown in FIG. 20. Now, in the center of FIG. 20, the values of K(11,10), K(12,11), and K(13,12) are different from FIG. 17. Also, the values of SK(11), SK(12), and SK(13), at the bottom of FIG. 20, are different from those in FIG. 17.

FIG. 20 illustrates a deceleration beginning with K11. This deceleration is detected by the deviation of the SK's from their steady value of −40. Of course, as explained above, the software can previously set this value of −40 to a baseline value of zero, so that a deviation of SK from zero is sought, rather than from −40.

It is seen that the progressive increase in SK, beginning with SK(10), indicates a deceleration. The amount of deceleration (for example, whether SK increases by M units above the previous SK) or the rate of deceleration (for example, whether SK increases by N units in a time T) can be used to infer the presence of an object. Other deviations in SK can be used to infer a need to shut down the motor.

Numerous substitutions and modifications can be undertaken without departing from the true spirit and scope of the invention. What is desired to be secured by Letters Patent is the invention as defined in the following claims.

The invention claimed is:

1. For an electric motor in a vehicle, and a sensor associated with the motor which produces a train of pulses wherein time intervals T(X) between adjacent pulses are inversely proportional to motor speed, a method comprising:
    a) starting the motor;
    b) computing a difference K(X) between each interval T(X) and the immediately preceding interval T(X−1);
    c) computing a running sum of the K(X)'s;
    d) determining when K(X) indicates that deceleration of the motor has occurred and, in response, setting the running sum to a baseline value; and
    e) determining whether the running sum deviates from the baseline value by a predetermined amount and, if so, either shutting down or reversing the motor.

2. Method according to claim 1, wherein the baseline value is set after initial acceleration of the motor.

3. For an electric motor in a vehicle, and a sensor associated with the motor which produces a train of pulses wherein time intervals T(X) between adjacent pulses are inversely proportional to motor speed, a method comprising:
    a) computing a sequence of differences K(X), each between an interval T(X) and the immediately preceding interval T(X−1);
    b) computing a running sum of the K(X)'s; and
    c) using the running sum to infer whether an obstacle is obstructing a device powered by the motor.

4. For an electric motor in a vehicle, and a sensor associated with the motor which produces a train of pulses wherein time intervals T(X) between adjacent pulses are inversely proportional to motor speed, a method comprising:
    a) computing a sequence of differences K(X), each between an interval T(X) and the immediately preceding interval T(X−1); and
    b) using the K(X)'s to determine when the motor reaches free-running speed after a start-up transient.

5. For an electric motor in a vehicle, and a sensor associated with the motor which produces a train of pulses wherein time intervals T(X) between adjacent pulses are inversely proportional to motor speed, apparatus comprising:
    a) means for starting the motor;
    b) means for computing a difference K(X) between each interval T(X) and the immediately preceding interval T(X−1);
    c) means for computing a running sum of the K(X)'s;
    d) means for determining when K(X) indicates that deceleration of the motor has occurred and, in response, setting the running sum to a baseline value; and
    e) means for determining whether the running sum deviates from the baseline value by a predetermined amount and, if so, either shutting down or reversing the motor.

6. Apparatus according to claim 5, wherein the baseline value is set after initial acceleration of the motor.

7. For an electric motor in a vehicle, and a sensor associated with the motor which produces a train of pulses wherein time intervals T(X) between adjacent pulses are inversely proportional to motor speed, apparatus comprising:
    a) means for computing a sequence of differences K(X), each between an interval T(X) and the immediately preceding interval T(X−1);
    b) means for computing a running sum of the K(X)'s; and
    c) means for using the running sum to infer whether an obstacle is obstructing a device powered by the motor.

8. For an electric motor in a vehicle, and a sensor associated with the motor which produces a train of pulses wherein time intervals T(X) between adjacent pulses are inversely proportional to motor speed, apparatus comprising:
    a) means for computing a sequence of differences K(X), each between an interval T(X) and the immediately preceding interval T(X−1); and
    b) means for using the K(X)'s to determine when the motor reaches free-running speed after a start-up transient.

* * * * *